United States Patent
Ueno et al.

(10) Patent No.: US 11,835,226 B2
(45) Date of Patent: Dec. 5, 2023

(54) METHOD OF DISASSEMBLING STEAM GENERATOR

(71) Applicant: MITSUBISHI HEAVY INDUSTRIES, LTD., Tokyo (JP)

(72) Inventors: Reiko Ueno, Tokyo (JP); Takeshi Yamamoto, Tokyo (JP); Yuki Kobayashi, Tokyo (JP); Daisuke Hara, Tokyo (JP); Masaki Noda, Tokyo (JP); Kohei Tada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/925,754

(22) PCT Filed: Apr. 26, 2022

(86) PCT No.: PCT/JP2022/018888
§ 371 (c)(1),
(2) Date: Nov. 16, 2022

(87) PCT Pub. No.: WO2023/053555
PCT Pub. Date: Apr. 6, 2023

(65) Prior Publication Data
US 2023/0213180 A1    Jul. 6, 2023

(30) Foreign Application Priority Data

Sep. 29, 2021  (JP) ................................ 2021-159780

(51) Int. Cl.
*F22B 37/58*    (2006.01)
*F22B 37/00*    (2006.01)

(52) U.S. Cl.
CPC ............ *F22B 37/58* (2013.01); *F22B 37/007* (2013.01)

(58) Field of Classification Search
CPC .............................. F22B 37/58; F22B 37/007
See application file for complete search history.

(56) References Cited

U.S. PATENT DOCUMENTS

| 4,173,060 A | 11/1979 | Massaro, Jr. et al. |
| 4,270,258 A | 6/1981 | Andrews et al. |

FOREIGN PATENT DOCUMENTS

| JP | 54-012002 A | 1/1979 |
| JP | 55-092801 A | 7/1980 |

(Continued)

OTHER PUBLICATIONS

Office Action dated Oct. 19, 2021, issued in counterpart JP Application No. 2021-159780, with machine translation. (8 pages).

*Primary Examiner* — Rick K Chang
(74) *Attorney, Agent, or Firm* — WHDA, LLP

(57) ABSTRACT

A method of disassembling a steam generator including a body portion, a water chamber, a tube plate and a plurality of heat transfer tubes, the method includes: a step of obtaining a disassembly target including the tube plate and a part of the heat transfer tubes; a step of specifying the heat transfer tube fixed to the tube plate; a step of releasing fixation between the part of the heat transfer tube and the tube plate; and a step of pulling out the part of the heat transfer tube from the through-hole, in the step of releasing the fixation, the TIG heating head is inserted from the primary region side, and in the step of releasing the fixation, the TIG heating head is moved to a plurality of streaks only in a direction from the primary region side to the secondary region side.

5 Claims, 4 Drawing Sheets

(56) References Cited

FOREIGN PATENT DOCUMENTS

| JP | 7-018531 B2 | 3/1995 | | |
|---|---|---|---|---|
| JP | 2007003430 A | * | 1/2007 | ............. Y02E 30/30 |
| JP | 2012-189247 A | | 10/2012 | |

* cited by examiner

METHOD OF DISASSEMBLING STEAM GENERATOR

TECHNICAL FIELD

The present disclosure relates to a method of disassembling a steam generator.

Priority is claimed on Japanese Patent Application No. 2021-159780, filed Sep. 29, 2021, the content of which is incorporated herein by reference.

BACKGROUND ART

The nuclear power generation facility is provided with a steam generator for generating steam by the heat extracted from a nuclear reactor. The steam generator mainly includes a cylindrical body portion, a hemispherical water chamber, a tube plate that divides a primary region on the water chamber side and a secondary region on the body portion side, and a plurality of heat transfer tubes extending to penetrate this tube plate in the thickness direction. The heat transfer tube is inserted through a through-hole formed in the tube plate, and is fixed to the tube plate by expanding the diameter thereof (expanding the tube) toward the outer peripheral side and welding at the lower end of the tube plate. Primary cooling water containing radioactive substances circulates inside the heat transfer tube.

In a case of performing disassembling work of the steam generator during the decommissioning of nuclear power generation facility, it is required not to spread contamination caused by radioactive substances to the surroundings when removing the heat transfer tube. In particular, it is necessary to prevent contamination from spreading from the heat transfer tube to the tube plate. For example, Patent Document 1 below describes a method for removing a heat transfer tube from a tube plate. In this method, a part inserted through the tube plate in the heat transfer tube is heated from the inside to release the fixation between the heat transfer tube and the tube plate. Accordingly, it is possible to easily pull out the heat transfer tube.

CITATION LIST

Patent Document

[Patent Document 1]
Japanese Examined Patent Application, Second Publication No. H7-18531

SUMMARY OF INVENTION

Technical Problem

However, the above method is premised on disassembling the existing steam generator in use, and the number of heat transfer tubes to be removed is one or several. On the other hand, when disassembling the steam generator during the decommissioning, all the heat transfer tubes are removed, and thus, it is required not to spread the contaminants to the surroundings, and efficient workability is also required.

The present disclosure has been made to solve the above problems, and an object of the present disclosure is to provide a method of efficiently disassembling a steam generator that can further reduce the spread of contaminants.

Solution to Problem

In order to solve the above problem, according to the present disclosure, there is provided a method of disassembling a steam generator including a body portion, a water chamber, a tube plate provided between the body portion and the water chamber, dividing a primary region on a water chamber side and a secondary region on a body portion side, and having a plurality of through-holes formed to penetrate in a thickness direction, and a plurality of heat transfer tubes inserted into the plurality of through-holes, the method including: a step of obtaining a disassembly target including the tube plate and a part of the heat transfer tubes by cutting end surfaces of the heat transfer tubes and the tube plate on a primary region side across the tube plate and cutting the heat transfer tubes to protrude from the tube plate on a secondary region side; a step of specifying the heat transfer tube fixed to the tube plate, among the heat transfer tubes included in the disassembly target; a step of releasing fixation between the part of the heat transfer tube and the tube plate by inserting a TIG heating head into the part of the heat transfer tube fixed to the tube plate to heat the heat transfer tube; and a step of pulling out the part of the heat transfer tube from the through-hole, in which in the step of releasing the fixation, the TIG heating head is inserted from the primary region side, and in the step of releasing the fixation, the TIG heating head is moved to a plurality of streaks only in a direction from the primary region side to the secondary region side along a longitudinal direction inside the part of the heat transfer tube.

In addition, in the step of obtaining the disassembly target, the end surfaces of the heat transfer tubes and the tube plate are cut such that the end surfaces are flush with each other on the primary region side across the tube plate.

Advantageous Effects of Invention

According to the present disclosure, it is possible to provide a method of efficiently disassembling a steam generator that can further reduce the spread of contaminants.

DESCRIPTION OF EMBODIMENTS

Hereinafter, a steam generator 10 and a method of disassembling the steam generator 10 according to the embodiment of the present disclosure will be described with reference to FIGS. 1 to 6.

(Configuration of Steam Generator)

Figure 1:
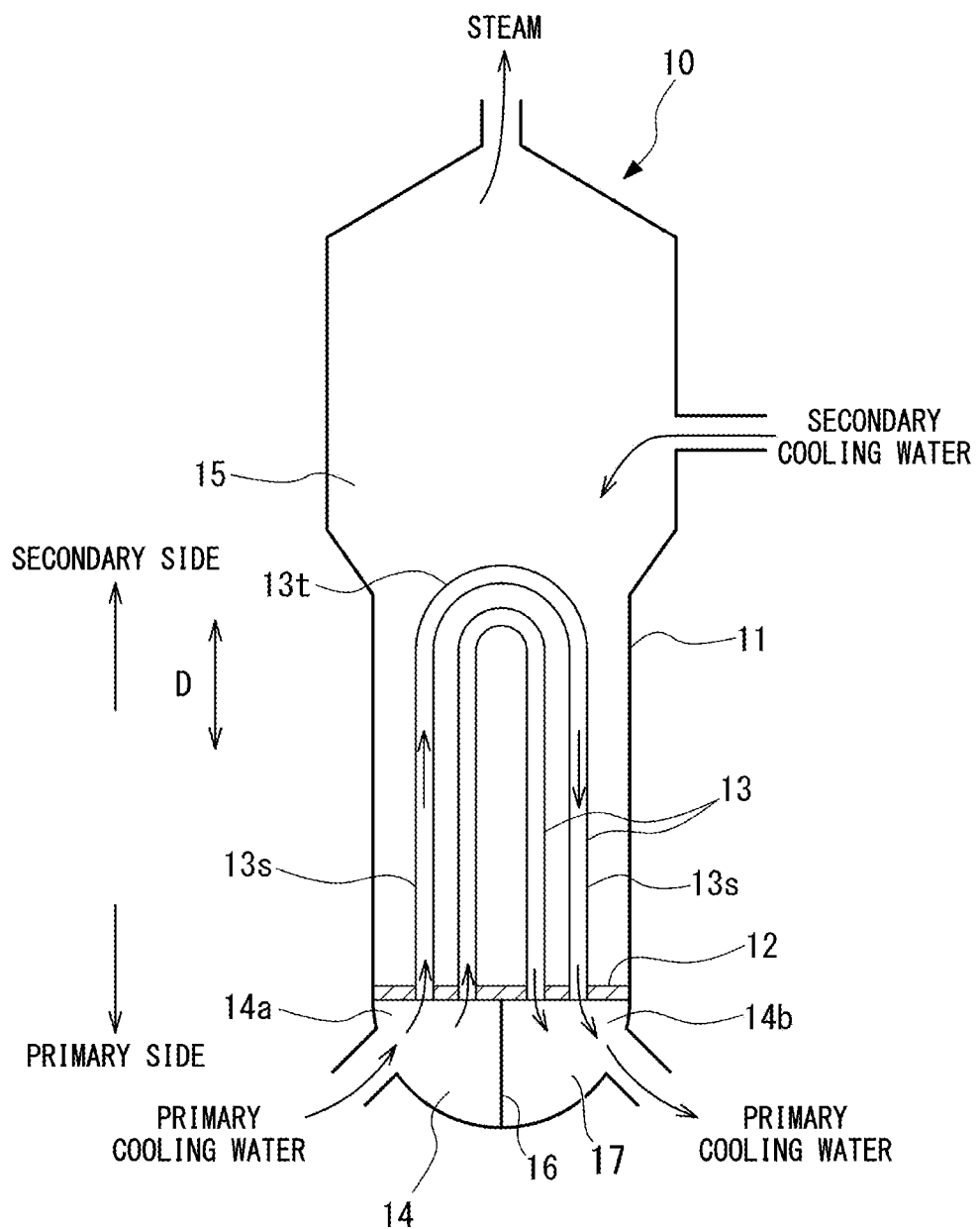
FIG. 1 is a schematic view showing a configuration of a steam generator according to an embodiment of the present disclosure.

As shown in FIG. 1, the steam generator 10 includes a body portion 11, a water chamber 17, a tube plate 12, a plurality of heat transfer tubes 13, and a partition 16. The body portion 11 has a cylindrical shape extending in an axial direction D. The water chamber 17 is provided below the body portion 11. The tube plate 12 is arranged between the body portion 11 and the water chamber 17. The tube plate 12 is arranged along a plane (for example, a horizontal plane) orthogonal to the axial direction D. The tube plate 12 partitions the body portion 11 and the water chamber 17. As a result, the steam generator 10 is formed with a primary cooling water chamber 14 (primary region) below the tube plate 12 and a secondary cooling water chamber 15 (secondary region) above the tube plate 12. The partition 16 divides the primary cooling water chamber 14 into an inlet side water chamber 14a and an outlet side water chamber 14b. Here, one side of the axial direction D with respect to the tube plate 12 is referred to as a primary side, and the other side of the axial direction D with respect to the tube plate 12 is referred to as a secondary side.

The plurality of heat transfer tubes 13 are arranged in the body portion 11. The plurality of heat transfer tubes 13 each have a pair of straight tube portions 13s and a curved portion 13t. The pair of straight tube portions 13s are formed at both end portions of each heat transfer tube 13. Each straight tube portion 13s extends from the primary side to the secondary side. The curved portion 13t is formed in the intermediate portion of each heat transfer tube 13. The curved portion 13t is formed by being curved in an inverted U shape. Both end portions of each heat transfer tube 13 (end portions 13b of each straight tube portion 13s) are fixed to the tube plate 12.

Figure 3:
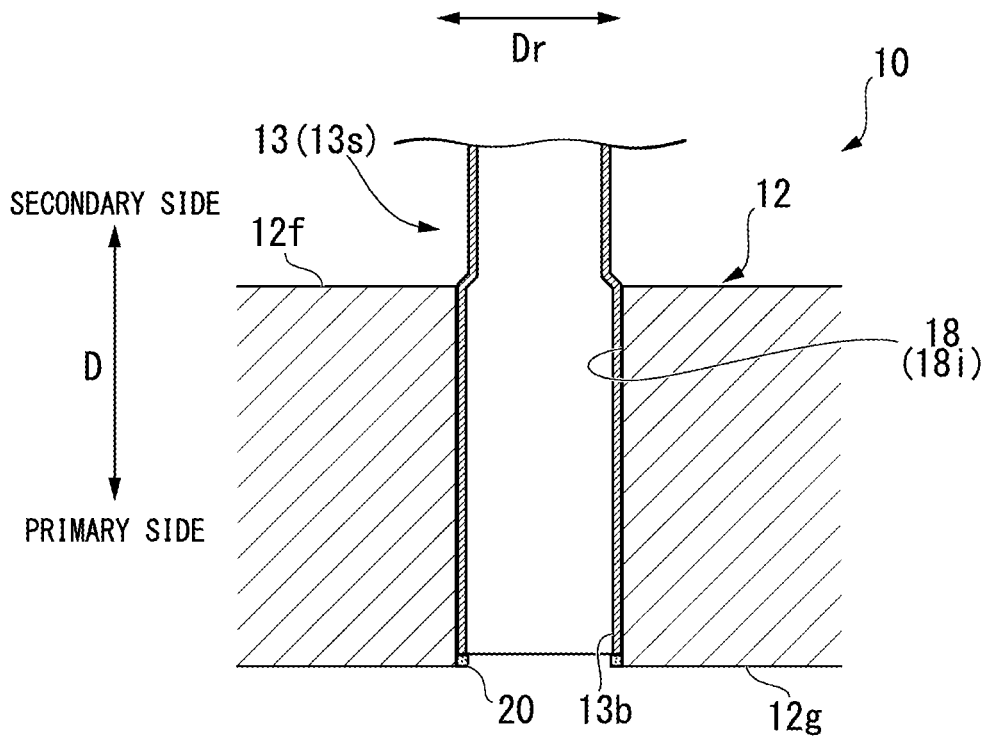
FIG. 3 is a cross-sectional view showing a configuration of a tube plate and a heat transfer tube according to the embodiment of the present disclosure.

As shown in FIG. 3, a plurality of through-holes 18 penetrating in the axial direction D are formed in the tube plate 12. Each heat transfer tube 13 (more specifically, the straight tube portion 13s) is inserted into each through-hole 18. In the through-hole 18, the heat transfer tube 13 is expanded toward the outside in a radial direction Dr. As a result, each heat transfer tube 13 is pressed against and fixed to an inner wall surface 18i of the through-hole 18.

The end portions 13b of each heat transfer tube 13 are arranged in the vicinity of a first surface 12g of the tube plate 12. The end portion 13b of each heat transfer tube 13 is bonded to the first surface 12g (and the inner wall surface 18i of the through-hole 18) of the tube plate 12 by seal welding. That is, the steam generator 10 has a welded portion 20 for fixing the end portion 13b of the heat transfer tube 13 and the first surface 12g of the tube plate 12.

As shown in FIG. 1, the primary cooling water heated by the nuclear reactor (not shown) is introduced into the inlet side water chamber 14a of the primary cooling water chamber 14 of the steam generator 10. The primary cooling water introduced into the inlet side water chamber 14a passes through the plurality of heat transfer tubes 13 exposed in the secondary cooling water chamber 15 and reaches the outlet side water chamber 14b of the primary cooling water chamber 14.

Secondary cooling water is introduced into the secondary cooling water chamber 15. The secondary cooling water is heated into steam by exchanging heat with the primary cooling water passing through the heat transfer tube 13 in the secondary cooling water chamber 15. The steam generated in the secondary cooling water chamber 15 is sent to a turbine (not shown) installed outside the steam generator 10. Further, the primary cooling water cooled by heat exchange with the secondary cooling water is sent to a nuclear reactor (not shown).

(Method of Disassembling Steam Generator)

Figure 2:
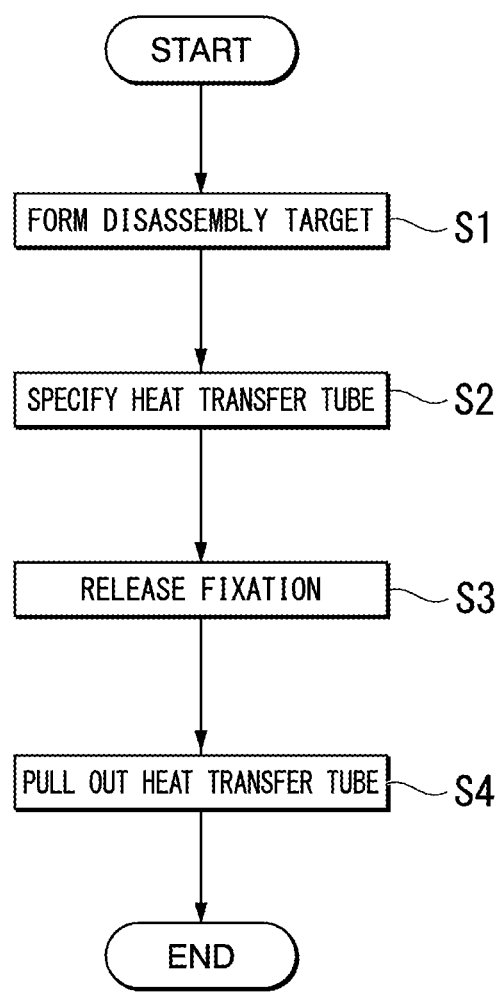
FIG. 2 is a flowchart showing a method of disassembling the steam generator according to the embodiment of the present disclosure.

Next, a method of disassembling the steam generator 10 will be described with reference to FIGS. 2 and 4 to 6. As shown in FIG. 2, the method of disassembling the steam generator 10 according to the present embodiment includes a disassembly target forming step S1, a heat transfer tube specifying step S2, a fixation release step S3, and a heat transfer tube pull-out step S4.

Figure 4:
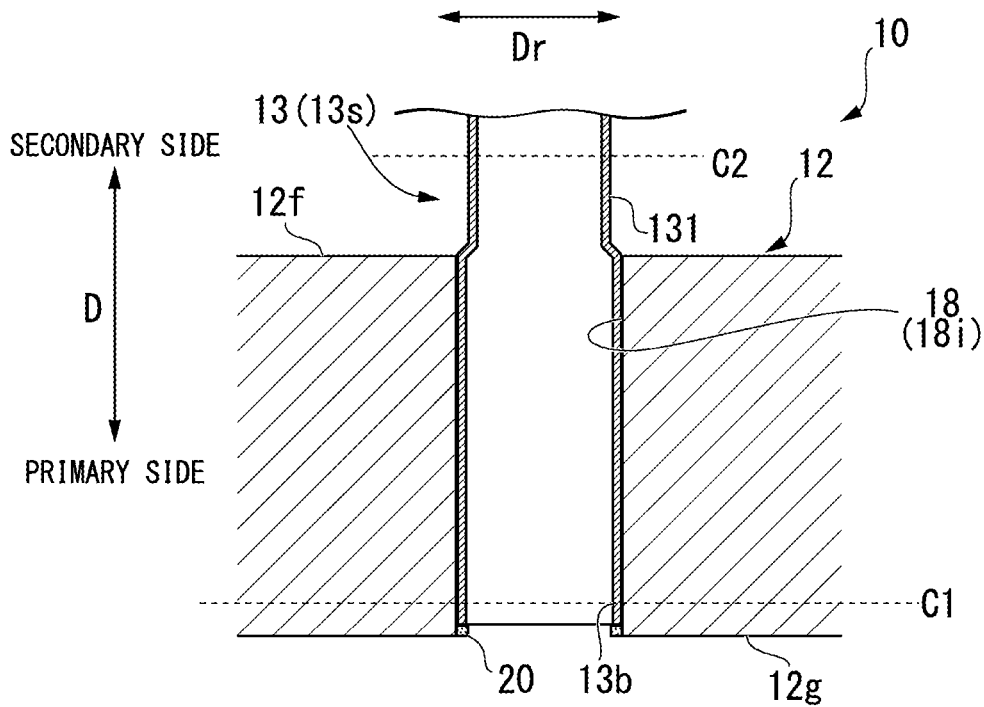
FIG. 4 is a cross-sectional view showing a configuration of a disassembly target according to the embodiment of the present disclosure.

As shown in FIG. 4, in the disassembly target forming step S1, the tube plate 12 and the heat transfer tube 13 are cut along cutting lines C1 and C2 on both sides of the thickness direction of the tube plate 12. According to the cutting line C1, the end surfaces of the heat transfer tubes 13 and the tube plate 12 are cut on the primary side across the tube plate 12. At this time, the welded portion 20 described above is removed together with a part of the tube plate 12. As a result, the end surfaces of the heat transfer tubes 13 and the tube plate 12 are flush with each other on the primary side of the tube plate 12.

Further, according to the cutting line C2, the heat transfer tube 13 is cut to protrude from the tube plate 12 on the secondary side. That is, on the secondary side, a part of the heat transfer tube 13 protrudes from the tube plate 12, and accordingly, a protruding portion 131 is formed. As a result, a disassembly target including the tube plate 12 and a part of the heat transfer tube 13 can be obtained.

Next, the heat transfer tube specifying step S2 is executed. In the heat transfer tube specifying step S2, the heat transfer tube 13 that may be fixed is specified based on the management information and/or the visual confirmation regarding each heat transfer tube 13. Here, since the heat transfer tube 13 includes the one that has been expanded as described above, the heat transfer tube 13 may be fixed to the through-hole 18 of the tube plate 12. In this step S2, the heat transfer tube 13 which is a target to be released from fixation in the subsequent step S3 is specified based on the management information and/or the visual confirmation including the tube expansion shape (partial tube expansion, full-thickness expansion tube) or the presence/absence of the plug and the sleeve.

Figure 5:
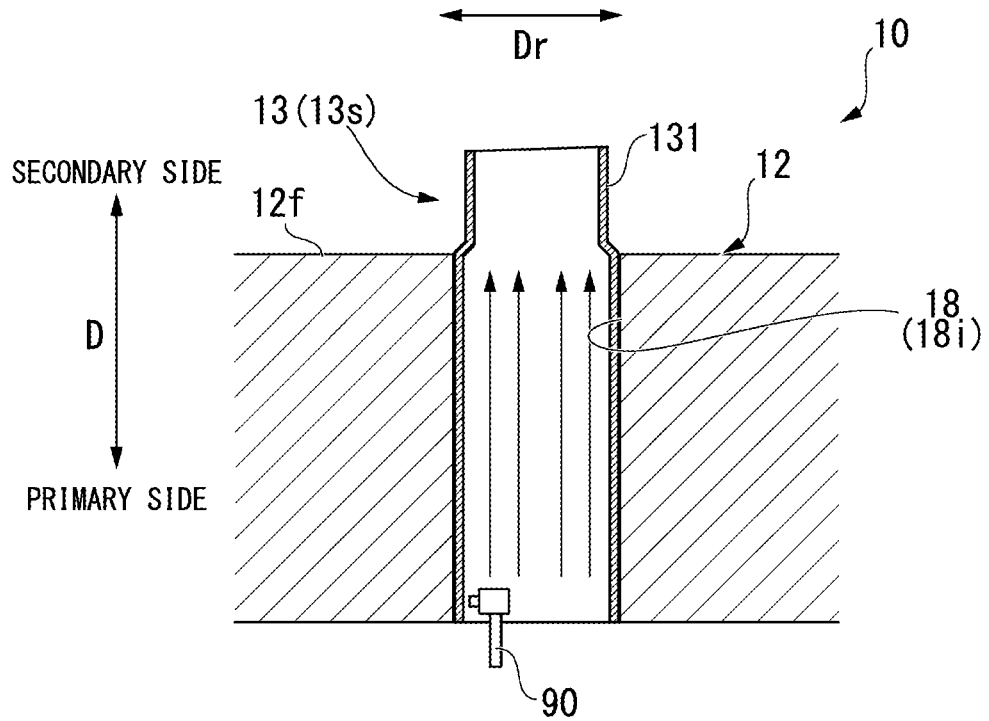
FIG. 5 is an explanatory diagram showing the state of a heating step according to the embodiment of the present disclosure.

Subsequently, the fixation release step S3 is executed. In the fixation release step S3, the fixation of the heat transfer tube 13 specified in the heat transfer tube specifying step S2 is released. As shown in FIG. 5, in this step S3, a TIG heating head 90 is inserted into the heat transfer tube 13 from the primary side. After that, the TIG heating head 90 is moved in the longitudinal direction of the heat transfer tube 13 from the primary side to the secondary side. Such movement is repeated in a plurality of streaks at intervals in the peripheral direction of the heat transfer tube 13. As a result, the heat transfer tube 13 contracts, and the fixation between the heat transfer tube 13 and the tube plate 12 is released. It is desirable that this fixation release step S3 be performed until the heat transfer tube 13 contracts by 0.5 to 1.5%.

Figure 6:
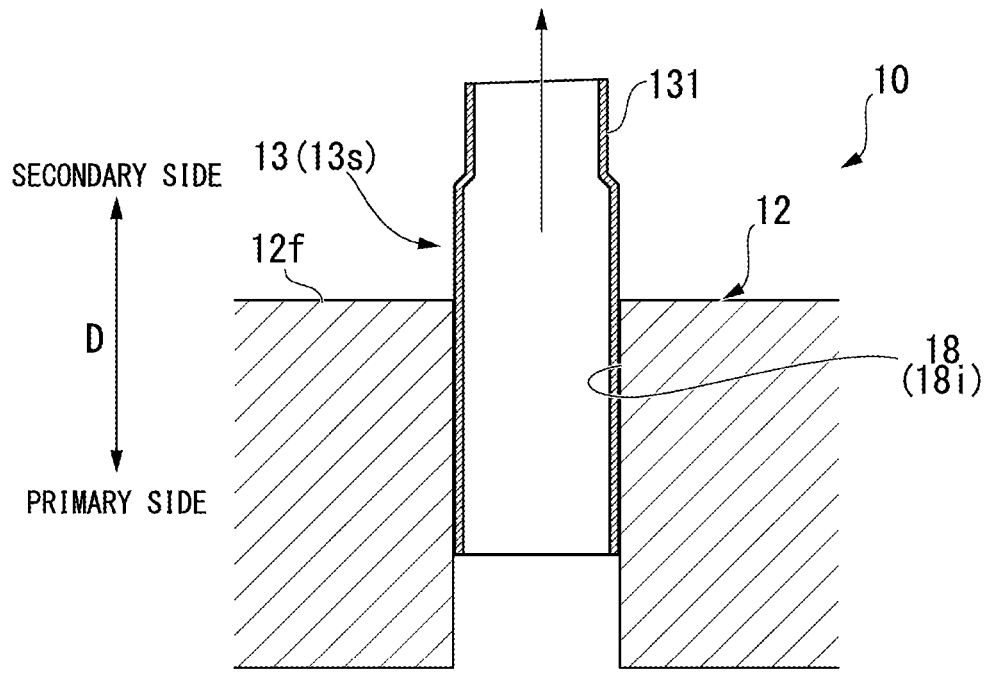
FIG. 6 is an explanatory diagram showing the state of a pull-out step according to the embodiment of the present disclosure.

Finally, the heat transfer tube pull-out step S4 is executed. As shown in FIG. 6, in this step S4, the protruding portion 131 of the heat transfer tube 13 in a state where the fixation thereof is released is ascertained by a tool or the like and pulled out of the secondary side. The above steps S3 and S4 are repeatedly executed for all the target heat transfer tubes 13. As a result, all the processes related to the method of disassembling the steam generator 10 according to the present embodiment are completed.

(Effects)

According to the above method, the fixation of the heat transfer tube 13 and the tube plate 12 is released by heating by the TIG heating head 90, and the heat transfer tube 13 can be easily pulled out of the tube plate 12. Further, the TIG heating head is inserted not from the secondary side where the heat transfer tube 13 protrudes from the tube plate 12, but from the primary side where the tube plate 12 and the heat transfer tube 13 overlap. As a result, damage to the heat transfer tube 13 due to heating of only the heat transfer tube 13 can be suppressed. Therefore, the heat transfer tube 13 and the tube plate 12 can be separated more smoothly.

Further, according to the above method, by moving the TIG heating head 90 to a plurality of streaks, the fixation between the heat transfer tube 13 and the tube plate 12 is stably released in the entire area in the peripheral direction and the longitudinal direction of the heat transfer tube 13.

Further, according to the above method, by gripping the heat transfer tube 13 from the secondary side where the heat transfer tube 13 protrudes from the tube plate 12, the heat transfer tube 13 can be more easily pulled out of the tube plate 12 by using a simple tool.

In addition, according to the above method, the fixed heat transfer tube 13 is specified based on the management information and/or the visual confirmation including the presence/absence of the plug or the state of the tube expansion. As a result, the risk that the heat transfer tube 13 cannot be pulled out is reduced, and the work can proceed more smoothly.

Furthermore, in the above method, in the fixation release step S3, heating is performed until the heat transfer tube 13 contracts by 0.5 to 1.5%. As a result, the heat transfer tube 13 can be pulled out of the tube plate 12 more easily and smoothly by sufficiently contracting the heat transfer tube 13.

(Other Embodiments)

Above, the embodiments of the present disclosure have been described in detail with reference to the drawings, but the specific configuration or method is not limited to the embodiments, and includes design changes and the like within a scope not departing from the gist of the present disclosure.

<Additional Remarks>

The method of disassembling the steam generator described in each embodiment is ascertained, for example, as follows.

(1) According to a first aspect, there is provided a method of disassembling the steam generator 10 including the body portion 11, the water chamber 17, the tube plate 12 provided between the body portion 11 and the water chamber 17, dividing a primary region on the water chamber 17 side and a secondary region on the body portion 11 side, and having the plurality of through-holes 18 formed to penetrate in a thickness direction, and the plurality of heat transfer tubes 13 inserted into the plurality of through-holes 18, the method of disassembling the steam generator 10 including: a step S1 of obtaining a disassembly target including a part of the tube plate 12 and the heat transfer tubes 13 by cutting end surfaces of the heat transfer tubes 13 and the tube plate 12 on the primary region side across the tube plate 12 and cutting the heat transfer tubes 13 to protrude from the tube plate 12 on the secondary region side; a step S2 of specifying the heat transfer tube 13 fixed to the tube plate 12, among the heat transfer tubes 13 included in the disassembly target; a step S3 of releasing fixation between a part of the heat transfer tube 13 and the tube plate 12 by inserting the TIG heating head 90 into the part of the heat transfer tube 13 fixed to the tube plate 12 and heating the heat transfer tube 13; and a step S4 of pulling out the part of the heat transfer tube 13 from the through-hole 18, in which in the step S3 of releasing the fixation, the TIG heating head 90 is inserted from the primary region side, and in the step S3 of releasing the fixation, the TIG heating head 90 is moved to a plurality of streaks only in a direction from the primary region side to the secondary region side along a longitudinal direction inside the part of the heat transfer tube 13.

According to the above method, the TIG heating head 90 is inserted not from the secondary region side where the heat transfer tube 13 protrudes from the tube plate 12, but from the primary region side where the tube plate 12 and the heat transfer tube 13 overlap. As a result, damage to the heat transfer tube 13 due to heating of only the heat transfer tube 13 can be suppressed. Further, by moving the TIG heating head 90 to a plurality of streaks, it is possible to stably release the fixation between the heat transfer tube 13 and the tube plate 12 in the entire area in the peripheral direction and the longitudinal direction of the heat transfer tube 13.

(2) According to the method of disassembling the steam generator 10 according to a second aspect, in the method of disassembling the steam generator 10 according to the first aspect, in the step S1 of obtaining the disassembly target, the end surfaces of the heat transfer tubes 13 and the tube plate 12 may be cut such that the end surfaces are flush with each other on the primary region side across the tube plate 12.

(3) According to the method of disassembling the steam generator 10 according to a third aspect, in the method of disassembling the steam generator 10 according to the first or second aspect, in the step S4 of pulling out the part of the heat transfer tube 13 from the through-hole 18, the part may be pulled out of the secondary region side.

According to the above method, by gripping the heat transfer tube 13 from the secondary region side where the heat transfer tube 13 protrudes from the tube plate 12, the heat transfer tube 13 can be more easily pulled out of the tube plate by using a simple tool.

(4) According to the method of disassembling the steam generator 10 according to a fourth aspect, in the method of disassembling the steam generator 10 according to any one of the first to third aspects, in the step S2 of specifying the fixed heat transfer tube 13, the heat transfer tube 13 which is a target to be pulled out may be specified based on management information and visual confirmation of the heat transfer tube 13.

According to the above method, the heat transfer tube 13 that can be fixed is specified based on the management information and/or the visual confirmation including the presence/absence of the plug or the state of the tube expansion. As a result, the risk that the heat transfer tube 13 cannot be pulled out is reduced, and the work can proceed more smoothly.

(5) According to the method of disassembling the steam generator 10 according to a fifth aspect, in the method of disassembling the steam generator 10 according to any one of the first to fourth aspects, in the step S3 of releasing the fixation, heating may be performed until the heat transfer tube 13 contracts by 0.5 to 1.5%.

According to the above method, the heat transfer tube 13 can be pulled out of the tube plate 12 more easily and smoothly by sufficiently contracting the heat transfer tube 13.

[Industrial Applicability]

The present disclosure relates to a method of disassembling a steam generator provided in a nuclear power generation facility. According to the present disclosure, the steam generator can be efficiently disassembled while reducing the spread of contaminants.

REFERENCE SIGNS LIST

10: Steam generator
11: Body portion

12: Tube plate
12f: Second surface
12g: First surface
13: Heat transfer tube
13b: End portion
13s: Straight tube portion
13t: Curved portion
14: Primary cooling water chamber
14a: Inlet side water chamber
14b: Outlet side water chamber
15: Secondary cooling water chamber
16: Partition
18: Through-hole
18i: Inner wall surface
20: Welded portion
90: TIG heating head
131: Protruding portion

What is claimed is:

1. A method of disassembling a steam generator including:
   a body portion having a cylindrical shape and extending in an axial direction,
   a water chamber provided below the body portion,
   a tube plate provided to partition between the body portion and the water chamber, and arranged along a plane orthogonal to the axial direction, and
   a plurality of heat transfer tubes inserted into a plurality of through-holes formed to penetrate the tube plate in the axial direction, wherein
   the steam generator is formed with a primary region below the tube plate and a secondary region above the tube plate,
   the method comprising:
   a step of obtaining a disassembly target including the tube plate and a part of the heat transfer tubes by cutting end surfaces of the heat transfer tubes and the tube plate on the primary region side across the tube plate and cutting the heat transfer tubes to protrude from the tube plate on the secondary region side;
   a step of specifying the heat transfer tube fixed to the tube plate, among the heat transfer tubes included in the disassembly target;
   a step of releasing fixation between the part of the heat transfer tube and the tube plate by inserting a TIG heating head into the part of the heat transfer tube fixed to the tube plate to heat the heat transfer tube; and
   a step of pulling out the part of the heat transfer tube from the through-hole, wherein
   in the step of releasing the fixation, the TIG heating head is inserted from the primary region side, and
   in the step of releasing the fixation, the TIG heating head is moved to a plurality of streaks only in a direction from the primary region side to the secondary region side along a longitudinal direction inside the part of the heat transfer tube.

2. The method of disassembling a steam generator according to claim 1, wherein
   in the step of obtaining the disassembly target, the end surfaces of the heat transfer tubes and the tube plate are cut such that the end surfaces are flush with each other on the primary region side across the tube plate.

3. The method of disassembling a steam generator according to claim 1, wherein
   in the step of pulling out the part of the heat transfer tube from the through-hole, the part is pulled out of the secondary region side.

4. The method of disassembling a steam generator according to claim 1, wherein
   in the step of specifying the fixed heat transfer tube, the heat transfer tube which is a target to be pulled out is specified based on management information and visual confirmation of the heat transfer tube.

5. The method of disassembling a steam generator according to claim 1, wherein
   in the step of releasing the fixation, heating is performed until the heat transfer tube contracts by 0.5 to 1.5%.

* * * * *